(12) United States Patent
Alrabady (10) Patent No.: US 6,639,953 B1
(45) Date of Patent: Oct. 28, 2003

(54) APPARATUS AND METHOD FOR EFFICIENT BINARY PHASE SHIFT KEY DATA DEMODULATION

(75) Inventor: Ansaf Ibrahem Alrabady, Livonia, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/507,969

(22) Filed: Feb. 22, 2000

(51) Int. Cl.[7] .............................. H03D 3/22; H04L 27/22
(52) U.S. Cl. ......................... 375/329; 375/279; 375/283
(58) Field of Search ................................. 375/329, 330, 375/331, 332, 316, 320, 322, 268, 269, 279, 280, 283

(56) References Cited

U.S. PATENT DOCUMENTS

| | | | |
|---|---|---|---|
| 4,885,756 A | * 12/1989 | Fontanes | 375/328 |
| 5,684,835 A | 11/1997 | Kroeger et al. | 375/330 |
| 5,805,642 A | 9/1998 | Wei et al. | 375/340 |
| 5,822,375 A | 10/1998 | Wei et al. | 375/331 |
| 6,046,629 A | * 4/2000 | Akiyama et al. | 329/304 |
| 6,148,020 A | * 11/2000 | Emi | 375/132 |

* cited by examiner

Primary Examiner—Mohammad H. Ghayour
(74) Attorney, Agent, or Firm—Tarolli, Sundheim, Covell & Tummino L.L.P.

(57) ABSTRACT

A binary phase shift key demodulator (64) demodulates a signal conveying bits. A vector computation component (88) computes an I, Q vector associated with a reference bit and computes an I, Q vector associated with a subsequent bit. A vector comparison component (92) interprets the subsequent bit as a first binary value if the vector associated with the subsequent bit is within a first range of vector angles from the vector associated with the reference bit, and interprets the subsequent bit as a second binary value if the vector associated with the subsequent bit is outside of a second range of vector angles from the vector associated with the reference bit. A power algorithm component (100) processes information associated with the subsequent bit to determine whether to interpret the subsequent bit as the first or second binary value if the vector associated with the subsequent bit is outside the first range of angles and within the second range of angles from the vector associated with the reference vector, and accordingly interprets the bit.

19 Claims, 4 Drawing Sheets

Fig.9

APPARATUS AND METHOD FOR EFFICIENT BINARY PHASE SHIFT KEY DATA DEMODULATION

FIELD OF THE INVENTION

The present invention relates to binary demodulators, and is particularly directed to improvements in the efficiency of binary demodulators for data conveyed via binary phase shift keying.

BACKGROUND OF THE INVENTION

Binary phase shift keying (BPSK) is one method utilized to convey binary data. In a BPSK system, sequential data bits are represented by phase shifts of a carrier frequency within a signal (i.e., a BPSK signal) that is output from a transmitter. For BPSK receivers, several techniques are known to demodulate BPSK signals and discern the information conveyed therein.

In one type of BPSK demodulation, a BPSK receiver generates I and Q channels. Each channel is independently sampled at a sample rate to provide a group of sample values. Each group of sample values is intended to be associated with one of the successive bits that are conveyed via the BPSK signal. An algorithm is performed to process each group of samples (i.e., the group of samples for the I channel and/or the group of samples for the Q channel) to make a determination as to whether the respective bit should be accorded a bit value of "1" or a bit value of "0". The algorithm is repeated for each bit.

The rate at which a BPSK receiver can demodulate information is dependent upon the speed at which the algorithm is performed within the receiver. Thus, the demodulation rate is directly related to the processing capabilities within the BPSK receiver. Small and/or low cost BPSK receivers may have associated limitations upon their ability (e.g., speed) at which they can process BPSK signals that convey data.

Many communication systems that currently exist utilize binary data communication. One particular type of such communication systems is the group of remote convenience systems that permit remote control of certain functions. One example type of a remote convenience system is for remotely controlling vehicle functions. Other example types of remote convenience systems include garage door opener systems and entry light activation systems.

Focusing on the remote convenience vehicle systems, remotely controlled vehicle functions include locking and unlocking functions of one or more vehicle doors. A remote convenience system that permits remote locking and unlocking is commonly referred to as a remote keyless entry system. Such remote vehicle systems may provide for control of other vehicle functions. For example, a remote vehicle alarm function, a remote vehicle locator function, and a remote vehicle engine start function may also be provided.

Known remote convenience vehicle systems include a receiver/controller unit mounted in an associated vehicle and at least one portable hand-held unit located remote from the receiver/controller unit. Typically, the portable unit has a relatively small size that permits carrying the portable unit within a pocket, within a purse, or on a key chain.

SUMMARY OF THE INVENTION

In accordance with one aspect, the present invention provides a binary phase shift key demodulator for a signal conveying bits. The demodulator includes means for associating an I, Q vector with a bit. Means assigns a first group of vector angles to a first binary value, assigns a second group of vector angles to a second binary value, and assigns a third group of vector angles as an indeterminate binary value. Means interprets the bit as the first binary value if the associated vector is within the first group. Means interprets the bit as the second binary value if the associated vector is within the second group. Means processes information associated with the bit to determine whether to interpret the bit as the first or second binary value if the associated vector is within the third group and for accordingly interprets the bit.

In accordance with another aspect, the present invention provides a binary phase shift key demodulator for a signal conveying bits. The demodulator includes means for associating an I, Q vector to a reference bit. Means associates an I, Q vector to a subsequent bit. Means interprets the subsequent bit as a first binary value if the vector associated with the subsequent bit is within a first range of vector angles from the vector associated with the reference bit. Means interprets the subsequent bit as a second binary value if the vector associated with the subsequent bit is outside of a second range of vector angles from the vector associated with the reference bit. Means processes information associated with the second bit to determine whether to interpret the subsequent bit as the first or second binary value if the vector associated with the subsequent bit is outside of the first range of angles and within the second range of angles from the vector associated with the reference vector and for accordingly interpreting the bit.

In accordance with another aspect, the present invention provides a method of binary phase shift key demodulation for a signal conveying bits. An I, Q vector is associated with a bit. A first group of vector angles is assigned to a first binary value. A second group of vector angles is assigned to a second binary value. A third group of vector angles is assigned as an indeterminate binary value. The bit is interpreted as the first binary value if the associated vector is within the first group. The bit is interpreted as the second binary value if the associated vector is within the second group. Information associated with the bit is processed to determine whether to interpret the bit as the first or second binary value if the associated vector is within the third group, and the bit is accordingly interpreted.

In accordance with still another aspect, the present invention provides a method of binary phase shift key demodulation for a signal conveying bits. An I, Q vector is associated to a reference bit. An I, Q vector is associating to a subsequent bit. The subsequent bit is interpreted as a first binary value if the vector associated with the subsequent bit is within a first range of vector angles from the vector associated with the reference bit. The subsequent bit is interpreted as a second binary value if the vector associated with the subsequent bit is outside of a second range of vector angles from the vector associated with the reference bit. Information associated with the subsequent bit is processed to determine whether to interpret the subsequent bit as the first or second binary value if the vector associated with the subsequent bit is outside the first range of angles and within the second range of angles from the vector associated with the reference vector, and the bit is accordingly interpreted.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
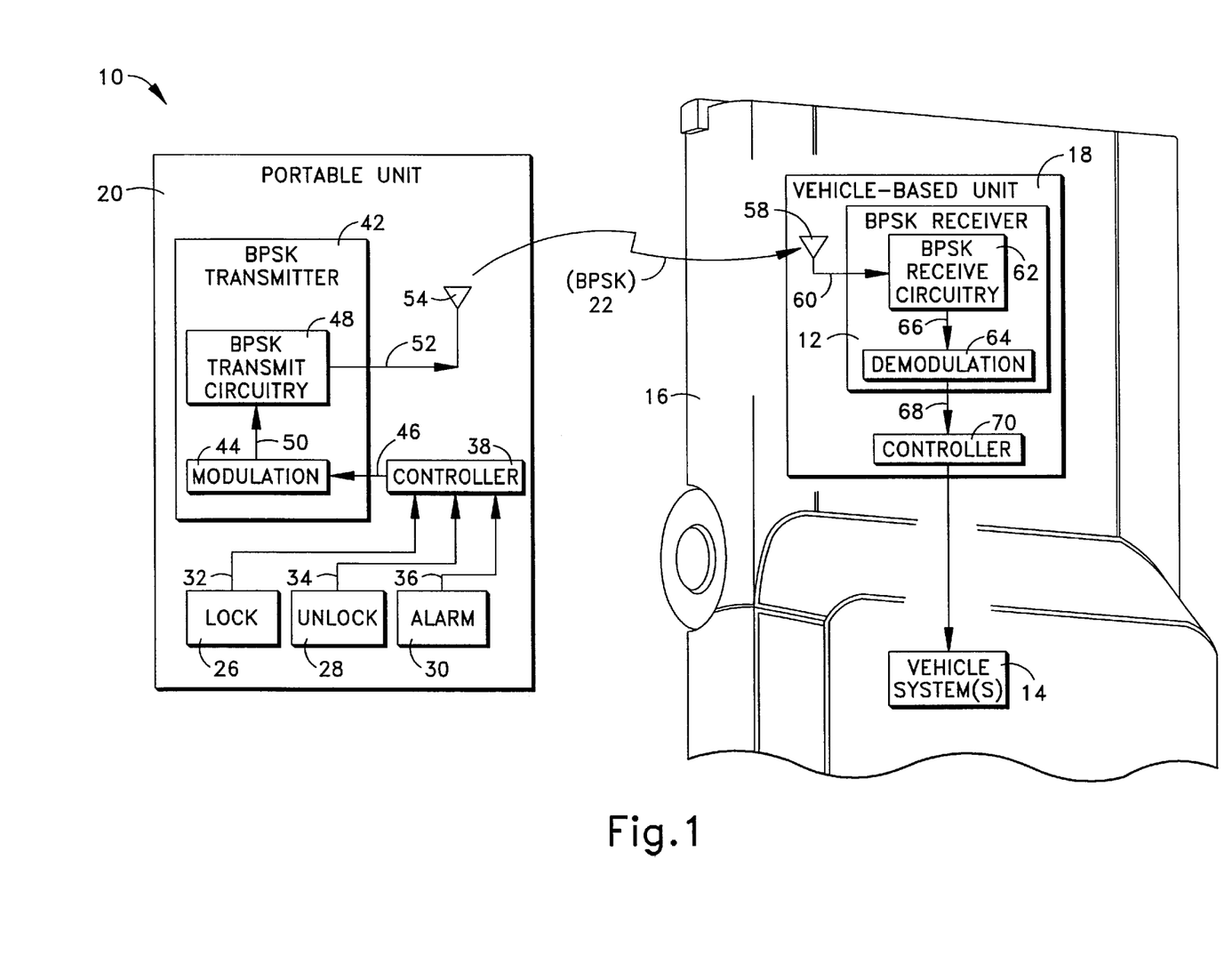
FIG. 1 is a schematic illustration of a communication system that includes a binary phase shift keying receiver in accordance with the present invention, along with an associated vehicle.

A communication system 10 that includes a binary phase shift keying ("BPSK") receiver 12 in accordance with the present invention is shown in FIG. 1. In the illustrated example of FIG. 1, the communication system 10 is a remote convenience vehicle system for remote control performance of at least one convenience function (e.g., unlock doors) at a vehicle system 14 (e.g., vehicle door lock actuator) of a vehicle 16.

Within the system 10, the BPSK receiver 12 is part of a vehicle-based unit 18 that is mounted in the vehicle 16. The system 10 also includes a transmitter unit 20 that is operable to communicate, via a signal 22, with the vehicle-based unit 18 to achieve remote control performance of the remote convenience function at the vehicle 16. A person (not shown, e.g., an owner of the vehicle 16) operates the transmitter unit 20 when the person desires performance of the remote convenience function at the vehicle. Within the example shown in FIG. 1, the vehicle-based unit 18 and the transmitter unit 20 are not drawn to the scale of the vehicle 16 for the purpose of ease of illustration.

It is to be appreciated that the present invention is applicable to other types of communication systems. Specifically, it is to be appreciated that the present invention is applicable to other types of remote convenience communication systems. Examples of such other types of systems include garage door control systems and entry light activation systems.

Focusing upon the transmitter unit 20, the unit is preferably a portable unit that has a relatively small size to permit carrying of the portable unit within a pocket, within a purse, or on a key chain. Hereinafter, the transmitter unit 20 is referred to as the portable unit 20. In the example shown in FIG. 1, the portable unit 20 has three pushbutton selector switches 26–30. A first pushbutton switch 26 and a second pushbutton switch 28 are associated with door lock and unlock functions, respectively. A third pushbutton switch 30 is associated with a vehicle alarm or "panic" function. It is to be appreciated that the remote convenience system 10 could be configured to control different remote convenience functions (e.g., vehicle locate) at the vehicle 16, and that system structure (e.g., a number and type of pushbutton switches on the portable unit) would be accordingly different.

Each actuation or predefined series of actuations of one of the pushbutton switches (e.g., 26) of the portable unit 20 is a request to perform a corresponding predefined remote convenience function. For example, actuating the first pushbutton switch 26 is a request to lock the doors of the vehicle 16. The pushbutton switches 26–30 are operatively connected 32–36 to provide input to a controller 38. The controller 38 interprets the input and generates/assembles a message "packet" of information to be transmitted. The message packet includes a start/wake-up portion, a security code, and at least one command that represents the remote function request.

Within the portable unit 20, a BPSK transmitter 42 processes the message packet to provide a BPSK format signal for transmission. A signal modulation portion 44 of the transmitter 42 is operatively connected 46 to the controller 38 and, in turn, BPSK transmit circuitry 48 is operatively connected 50 to the signal modulation portion. In response to receipt of the message packet, the modulation portion 44 and the BPSK transmit circuitry 48 cooperate to provide an electrical BPSK format stimulus signal to an operatively connected 52 antenna 54. In response to electrical stimulus signal, the antenna 54 broadcasts the signal 22 that is intended to be received by the vehicle-based unit 18. The broadcast signal 22 is in BPSK format and conveys the message packet from the portable unit 20 to the vehicle-based unit 18. Components and circuitry of the BPSK transmitter 42 for providing an electrical stimulus signal in BPSK format are known in the art and are not discussed herein.

At the vehicle-based unit 18, an antenna 58 is operatively connected 60 to the BPSK receiver 12. Within the BPSK receiver 12, BPSK receive circuitry 62 is operatively connected to receive an electrical stimulus signal provided by the antenna 58. In turn, a demodulation portion 64 of the BPSK receiver 12 is operatively connected 66 to receive output from the BPSK receive circuitry 62. The demodulation portion 64 demodulates the signal and provides the conveyed message packet to an operatively connected 68 controller 70 of the vehicle-based unit 18. The controller 70 processes the message packet and, in turn, provides the appropriate control signal to the vehicle system 14.

Figure 2:
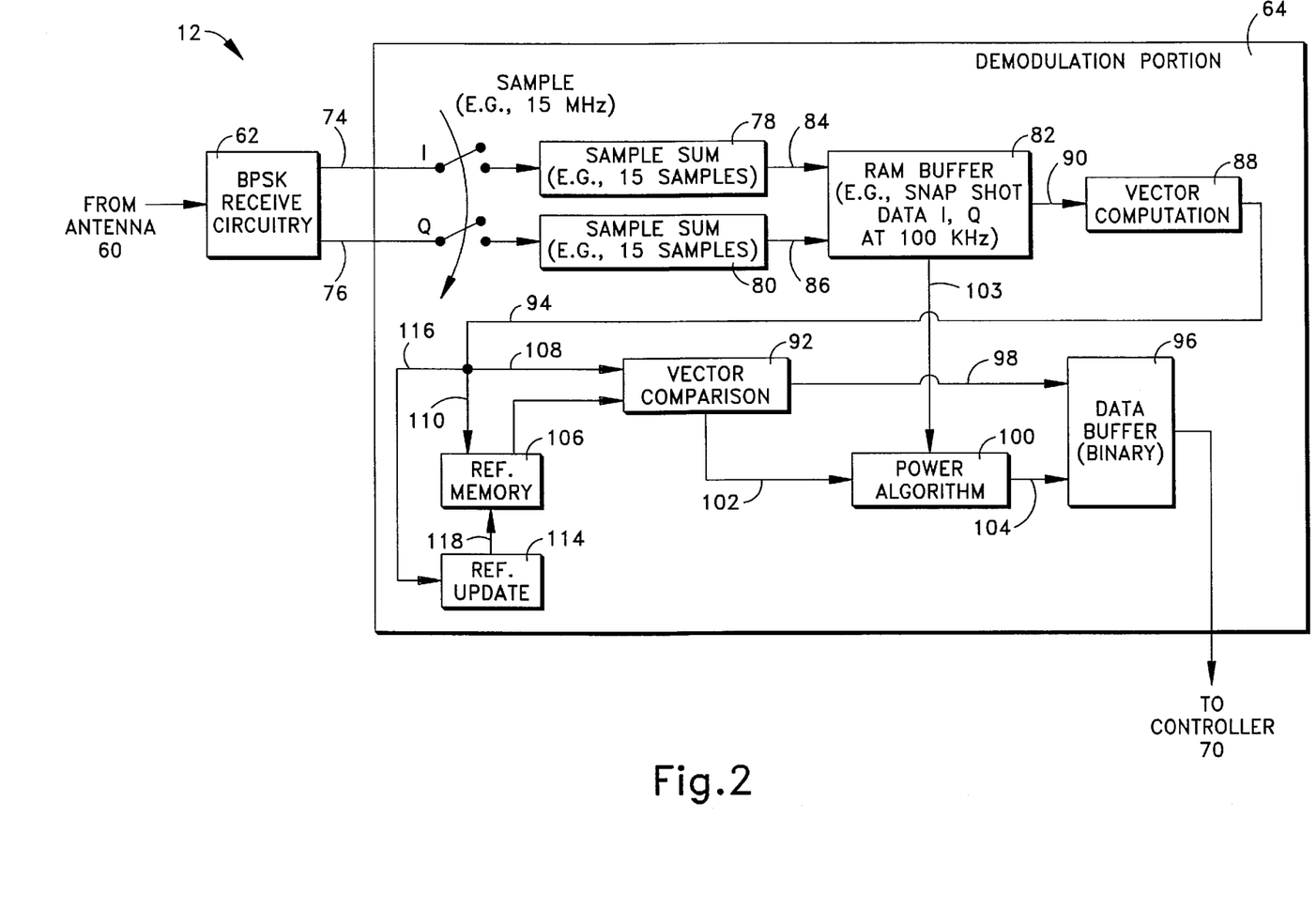
FIG. 2 is a function block diagram of the binary phase shift keying receiver shown in FIG. 1.

Turning to the BPSK receiver 12, attention is directed to FIG. 2, which shows details of the BPSK receiver and specifically shows details of the demodulation portion 64. The output from the antenna 58 is processed by the BPSK receive circuitry 62 to provide an I and a Q channel output 74, 76 from the BPSK receive circuitry. BPSK receive circuitries that provide output on the I and Q channels are known in the art and are not discussed herein.

Within the demodulation portion 64, each of the I and Q channels 74, 76 is sampled at a predetermined sample rate and the samples are provided to respective summation components 78, 80. Each summation component 78, 80 sums a predetermined number of samples. A RAM buffer 82 is operatively connected 84, 86 to the summation components 78, 80 to receive the summation values. The RAM buffer 82 store the summation values as I, Q pairs. Each I, Q pair is associated with data bit. The RAM buffer 82 can be termed a snapshot data storage device.

In the illustrated example, each of the I and Q channels is sampled at 1.5 MHz. Also within the illustrated example, each summation component (e.g., 78) sums values in 15 sample groups. Still further, in accordance with the illustrated example, the RAM buffer 82 stores the I, Q pair values at 100 kHz.

A vector computation component 88 is operatively connected 90 to the RAM buffer 82, and each I, Q pair is provided from the RAM buffer to the vector computation component. Within the vector computation component 88, a vector within the I, Q domain is computed for each data bit. Thus, a vector is associated with each data bit.

Figure 3:
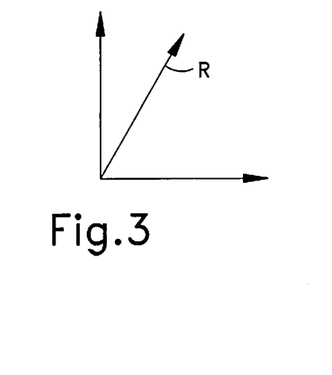
FIG. 3 is a plot of a reference vector.

It is to be appreciated that each vector extends along a radial direction from an I, Q coordinate origin and thus has an angular attribute. An example of a vector R within the I, Q domain is shown in FIG. 3 (i.e., plotted onto an I, Q coordinate plane).

A vector comparison component 92 (FIG. 2) is operatively connected 94 to the vector computation component 88, and information (e.g., the angular attribute) regarding each computed vector is provided to the vector comparison component. Within the vector comparison component 92, determinations are made with regard to interpretations of the binary value of the data bit associated with each vector. A data buffer 96 is operatively connected 98 to the vector comparison component 92 to receive binary value data from the vector comparison component. If the vector comparison component 92 successively interprets the binary value of the bit associated with each vector, the binary value is provided the data buffer 96. If the vector comparison component 92 is not successful in making an interpretation of the binary value of the bit associated with a vector, the vector comparison component abstains from providing a binary value for the bit to the data buffer 96.

The demodulation portion 64 also includes a power algorithm component 100 that is operatively connected 102 to the RAM buffer 82, operatively connected 103 to the vector comparison component 92, and operatively connected 104 to the data buffer 96. If the vector comparison component 92 does not successfully interpret the binary value associated with a particular vector, the power algorithm component 100 is employed to make a binary value determination. Upon a determination by the power algorithm component 100, a binary value for the bit is provided to the data buffer 96. At this point, it is to be noted that a determination of binary value via the vector comparison component 92 requires less time and/or computational capacity than a determination of binary value via the power algorithm component 100.

Focusing on the vector comparison component 92, a relatively expedite binary determination can be made for a bit if the vector associated with the bit has a certain characteristic. Thus, the more time consuming operation of the power algorithm component 100 can be avoided. The vector characteristic that is utilized in the vector comparison component is the amount of angular difference from a reference vector.

Consider that the vector R shown in FIG. 3 is a reference vector and the reference vector is associated with a reference bit that has a predetermined binary value. A reference memory 106 is provided to store information regarding the reference bit, the reference vector, and the binary value of the reference bit. The vector comparison component 92 is operatively connected 108 to the reference memory 106 to access the stored information.

Within the vector comparison component 92, a binary value of a bit can be determined based upon determinations about angular difference of the associated vector from the reference vector. If the associated vector is within a first predetermined range of angles (e.g., within α in either direction, see FIG. 4) from the reference vector, then the binary value of the associated bit is determined to be the same binary value as that of the reference bit. In other words, the first predetermined range of angles (e.g., the range from α to −α from the reference vector) is associated with the binary value of the reference bit, and a vector located with the first predetermined range of angles results in the associated bit being interpreted as having the same binary value as the reference bit.

Figure 4:
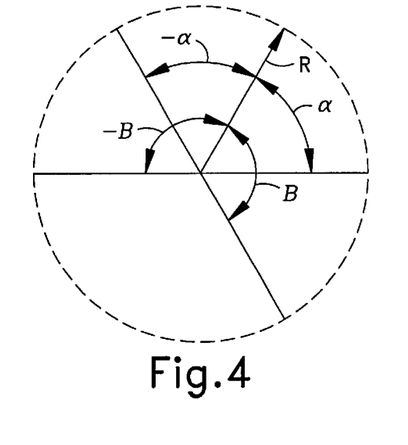
FIG. 4 is an illustration showing angle groups extending from the vector of FIG. 3.

If the associated vector is outside of a second predetermined range of angles from the reference vector (e.g., the range extending β to −β from the reference vector), then the binary value of the associated bit is determined to be the opposite binary value as that of the reference bit. It is to be appreciated that the group of angles greater than the absolute value of ±α is itself a range of angles and can be referred to as an opposed/second range of angles. Within such a definition, an angle > |±β| from the reference vector is within the opposed/second range of angles. For both definitions, the opposite binary value of the reference bit is accordingly associated, and a vector accordingly located results in the associated bit to being interpreted as having the opposite binary value as the reference bit.

If the associated vector is at an angle that is not associated with either the binary value of the reference bit or the opposite binary value, then the vector is within a third/indeterminate range. Specifically, if the vector is at an angle greater than |±α| but less than |±β| from the reference vector, then the binary value of the associated bit cannot be determined by the vector comparison component 92 and the power algorithm component 100 must be employed to make a binary value determination.

In one preferred example α is 60° and β is 120°. Thus, the first range of angles is within |±60°| from the reference vector. The boundary for the second range of angles is at ±120° from the reference vector. The third/indeterminate range of angles lies between 60° and 120°, and between −60° and −120°.

In one example of the present invention, a first bit conveyed via the signal 22 (FIG. 1) is the reference bit and is accorded a pre-assigned binary value (e.g., the binary value 1). The reference memory 106 (FIG. 2) is operatively connected 110 to the vector computation component 88 to receive the vector information regarding the reference vector. Whatever vector angle orientation is computed for the reference vector, that vector angle is used as the basis for the angle ranges within the vector comparison component.

Figure 5:
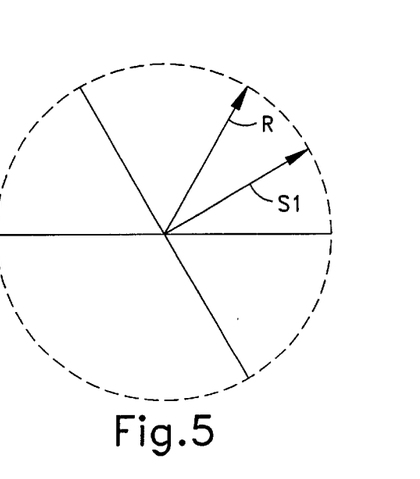
FIG. 5 is an illustration showing a relationship of a first vector to the reference vector and the angle groups.
Figure 6:
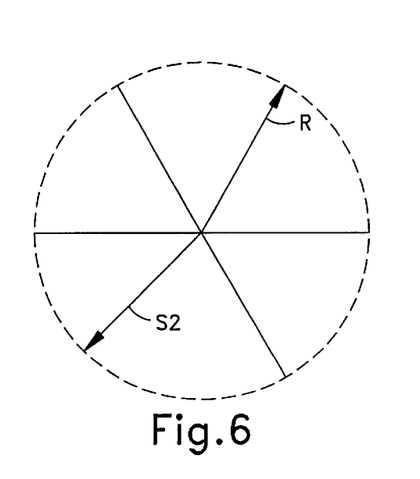
FIG. 6 is an illustration showing a relationship of a second vector to the reference vector and the angle groups.
Figure 7:
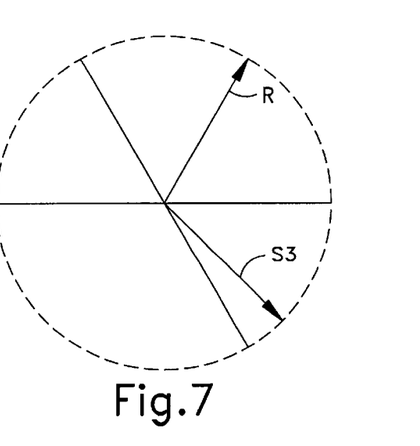
FIG. 7 is an illustration showing a relationship of a third vector to the reference vector and the angle groups.

A subsequent bit that has an associated vector S1 (FIG. 5) that lies within the first range of angles is determined to have the binary value 1. Another subsequent bit that has an associated vector S2 (FIG. 6) that lies beyond ±β from the reference vector is determined to have the binary value 0. Still another subsequent bit that has an associated vector S3 (FIG. 7) that lies within the indeterminate range of angles can not have its binary value determined by the vector comparison component 92 (FIG. 2) and the power algorithm component 100 must make the binary value determination.

Turning to the power algorithm component 100, several types of algorithms can be performed to make binary value determinations when the vector comparison component is not able to make a binary value determination (i.e., the vector is within the range greater than ±α and less than ±β from the reference vector). As one example, the power algorithm can make a determination regarding binary value using only the more stable of the two channels I and Q (and thus not utilize a vector).

To determine which channel is more stable, the power algorithm component 100 generates a bit power value that is proportional to the stability of the samples in the RAM buffer 82 for each bit. Each sample on both of the I and Q channels has a value that indicates whether the binary value of a bit should be 1 or 0. A value indicative of stability on a channel (e.g., I channel) is the absolute difference between the number samples indicating a binary bit value 1 and the number of samples indicating a binary bit value 0 recorded for each bit.

Consider the example of a bit time that consists of the following RAM buffer samples: 1110100101 on the I channel and 1101110111 on the Q channel. The bit power on the I channel is equal to 2 (i.e., 6–4) and the bit power is equal to 6 (i.e., 8–2) on the Q channel. The Q channel has a greater bit power, and appears to be the more stable channel.

To increase the reliability of the stability determination, absolute bit powers are summed over several bit times and the summation results are compared to make the stability determination. For example, the absolute bit powers for seven bit times are summed. The channel with the greater summed bit power has the greater stability and is thus used to make a determination as to a binary value for a bit that the vector comparison component 92 was unable to determine. It is to be appreciated that the processing that occurs within the power algorithm component 100 requires greater processing capacity and/or a greater amount of processing time than the determinations that are made within the vector comparisons portion. Thus, in accordance with the present invention, making binary value determinations within the vector comparison component 92 for those vectors that fall within the pre-subscribed angle values saves processor capacity/processor time.

It is acknowledged that a string of bits that is transmitted in a BPSK format may have vectors that progressively rotate (i.e., progress) about the I, Q origin due to system tolerances (e.g., a difference between the transceiver and receiver crystal frequencies that cause oscillator variation) and outside interference. In order for the progression to be compensated and to avoid misinterpreting binary values, the demodulation portion 64 includes a reference vector update component 114 that is operatively connected 116 to the vector computation component 88 and is operatively connected 118 to the reference memory 106. Compensation is achieved by utilizing a running weighted average of the vector angles that are computed for the received data bits. Vectors associated with both binary values are used for the compensation (a vector associated with the binary value opposite the binary value of the reference bit merely has 180° subtracted from its angle before use in the weighted averaging).

For the weighted averaging, vectors are accorded a weight dependent upon how recent the vector was calculated. In one example, a compensation to the reference vector is based upon the last three or four calculated vectors. The weighted sum is derived giving a full weight to a most recent vector, one-half weight to the second most recent vector, one-quarter weight to a third most recent vector, and one-eighth weight to a fourth most recent vector. The values are summed accordingly and a new reference vector is calculated. The reference vector update component 114 then provides the updated reference vector to the reference memory 106.

Figure 8:
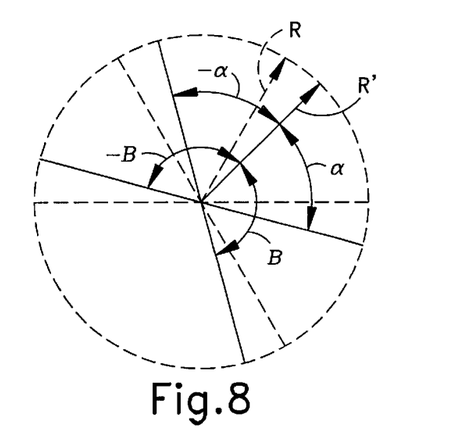
FIG. 8 is an illustration showing a reference vector update.

An example of an updated reference vector R' is shown in FIG. 8. A previous reference vector R and the associated range of angles are shown in dashed lines and an updated reference vector and the associated range of angles are shown in solid lines.

Figure 9:
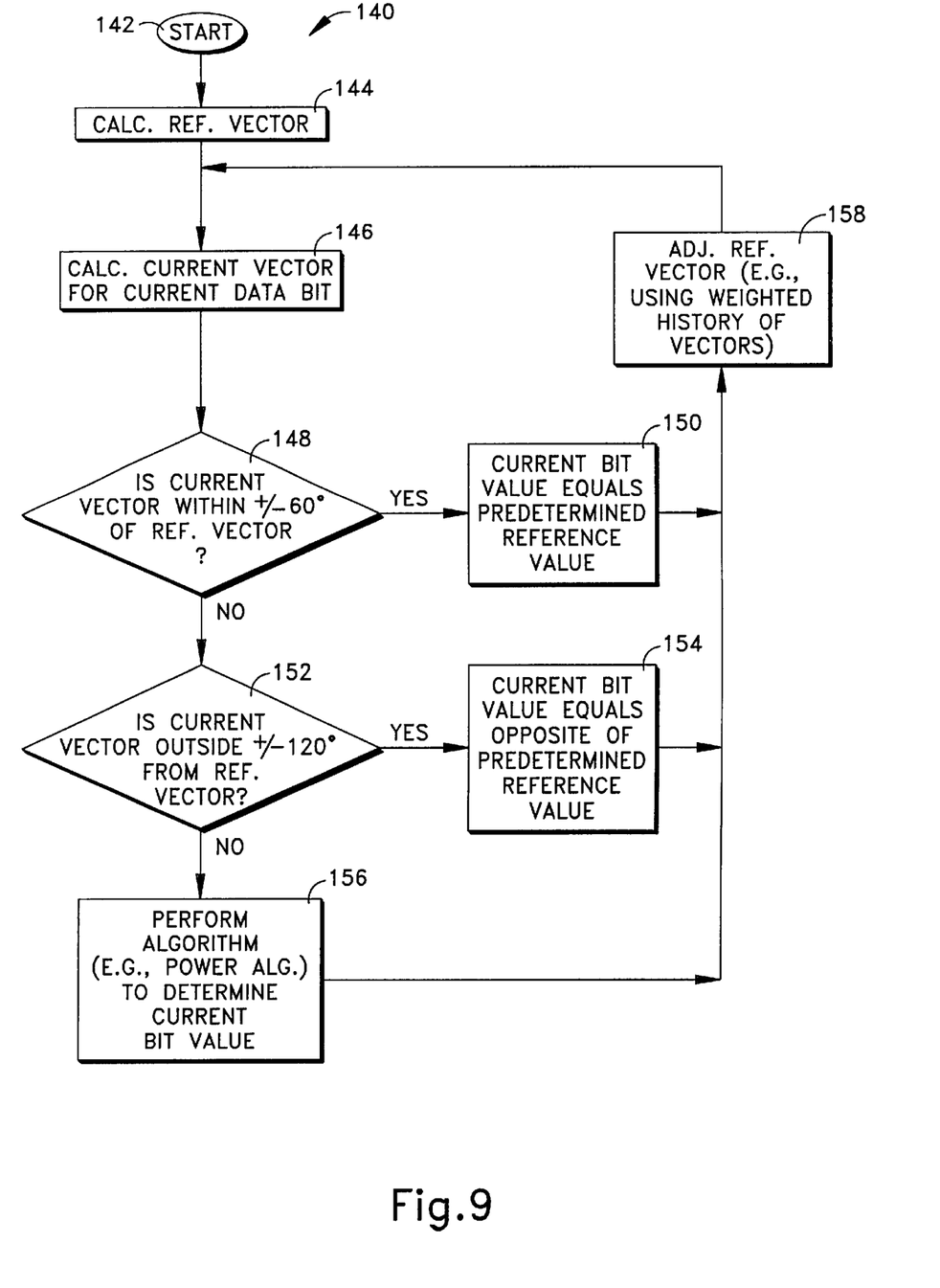
FIG. 9 is a flow chart for a process performed within the binary phase shift keying receiver of FIG. 2.

FIG. 9 illustrates a process 140 performed within the demodulation portion 64 (FIG. 2). The process 140 (FIG. 9) is initiated at step 142 and proceeds to step 144. At step 144, the reference vector is calculated. At step 146, a current vector associated with a current data bit is calculated. At step 148, it is determined whether the current vector is within ±60° of the reference vector. If the determination at step 148 is affirmative (i.e., the current vector is within ±60°), the process 140 goes from step 148 to step 150. At step 150, the binary value of the current bit is set equal to the predetermined binary value of the reference bit.

Returning to step 148, if the determination at step 148 is negative (i.e., the current vector is not within ±60° of the reference vector), the process 140 goes from step 148 to step 152. At step 152, it is determined whether the current vector is outside of ±120° from the reference vector. If the determination at step 152 is affirmative (i.e., the current vector is outside of ±120°), the process 140 goes from step 152 to step 154. At step 154, the binary value of the current bit is set equal to the opposite of the predetermined binary value the reference bit.

Returning to step 152, if the determination at step 152 is negative (i.e., the current vector is within ±120°, but not within ±60° per the determination of step 148), the process 140 goes from step 152 to step 156. At step 156, the power algorithm is performed to determine the binary value of the current bit.

Upon completion of step 150, step 154, or step 156, the process 140 goes to step 158. At step 158, the reference vector is adjusted. For example, adjustment is made using a weighted history of proceeding vectors. Upon completion of step 158, the process 140 loops to step 146 to calculate the next current vector.

From the above description of the invention, those skilled in the art will perceive improvements, changes and modifications. For example the components of the demodulation portion may be discrete circuitries or may be a microcomputer performing a program. Also, the ranges defined from the reference vector need not be symmetrical for the positive and negative angles. For example, the first range may be between +α and −δ, with |+α| not equal to |+δ|. Such improvements, changes and modifications within the skill of the art are intended to be covered by the appended claims.

Having described the invention, the following is claimed:

1. A binary phase shift key demodulator for a signal conveying bits, said demodulator comprising:

means for associating an I, Q vector with a bit;

means for assigning a first group of vector angles to a first binary value, for assigning a second group of vector angles to a second binary value, and for assigning a third group of vector angles as an indeterminate binary value;

means for interpreting the bit as the first binary value if the associated vector is within the first group;

means for interpreting the bit as the second binary value if the associated vector is within the second group; and means for processing information associated with the bit to determine whether to interpret the bit as the first or second binary value if the associated vector is within the third group, and for accordingly interpreting the bit.

2. A demodulator as set forth in claim 1, wherein said means for assigning a first group of vector angles to a first binary value includes means for assigning angles within a first range from a reference vector to a binary value associated with a reference bit, and said means for assigning a second group of vector angles to a second binary value includes means for assigning angles outside of a second range from the reference vector to an opposite binary value of the reference bit.

3. A demodulator as set forth in claim 2, wherein said means for assigning a third group of vector angles to an indeterminate binary value includes assigning angles outside of the first range of angles and inside the second range of angles to the indeterminate binary value.

4. A demodulator as set forth in claim 1, wherein said means for assigning a first group of vector angles to a first binary value includes assigning angles within ±60° from a reference vector to a binary value associated with a reference bit, and said means for assigning a second group of vector angles to a second binary value includes assigning angles outside of ±120° from the reference vector to an opposite binary value of the reference bit.

5. A demodulator as set forth in claim 4, including means for updating the reference vector.

6. A demodulator as set forth in claim 1, including means for providing the data bit as I and Q channel information, wherein said means for processing information associated with the bit to determine whether to interpret the bit as the first or second binary value includes means for processing information derived from either the I channel or the Q channel.

7. A binary phase shift key demodulator for a signal conveying bits, said demodulator comprising:
   means for associating an I, Q vector to a reference bit;
   means for associating an I, Q vector to a subsequent bit;
   means for interpreting the subsequent bit as a first binary value if the vector associated with the subsequent bit is within a first range of vector angles from the vector associated with the reference bit;
   means for interpreting the subsequent bit as a second binary value if the vector associated with the subsequent bit is outside of a second range of vector angles from the vector associated with the reference bit; and
   means for processing information associated with the subsequent bit to determine whether to interpret the subsequent bit as the first or second binary value if the vector associated with the subsequent bit is outside the first range of angles and within the second range of angles from the vector associated with the reference vector, and for accordingly interpreting the bit.

8. A demodulator as set forth in claim 7, wherein said means for interpreting the subsequent bit as a first binary value includes means for interpreting the subsequent bit as the first binary value if the vector associated with the subsequent bit is within ±60° from the vector associated with the reference bit, said means for interpreting the subsequent bit as a second binary value includes means for interpreting the subsequent bit as the second binary value if the vector associated with the subsequent bit is outside of ±120 from the vector associated with the reference bit.

9. A demodulator as set forth in claim 7, including means for updating the vector reference associated with the reference bit.

10. A demodulator as set forth in claim 7, including means for providing the data bit as I and Q channel information, wherein said means for processing information associated with the subsequent bit to determine whether to interpret the bit as the first or second binary value includes means for processing information derived from either the I channel or the Q channel.

11. A method of binary phase shift key demodulation for a signal conveying bits, said method comprising:
   associating an I, Q vector with a bit;
   assigning a first group of vector angles to a first binary value;
   assigning a second group of vector angles to a second binary value;
   assigning a third group of vector angles as an indeterminate binary value;
   interpreting the bit as the first binary value if the associated vector is within the first group;
   interpreting the bit as the second binary value if the associated vector is within the second group; and
   processing information associated with the bit to determine whether to interpret the bit as the first or second binary value if the associated vector is within the third group, and for accordingly interpreting the bit.

12. A method as set forth in claim 11, wherein said step of assigning a first group of vector angles to a first binary value includes assigning angles within a first range from a reference vector to a binary value associated with a reference bit, and said step of assigning a second group of vector angles to a second binary value includes assigning angles outside of a second range from the reference vector to an opposite binary value of the reference bit.

13. A method as set forth in claim 12, wherein said step of assigning a third group of vector angles to an indeterminate binary value includes assigning angles outside of the first range of angles and inside the second range of angles to the indeterminate binary value.

14. A method as set forth in claim 13, including updating the reference vector.

15. A method as set forth in claim 1, including providing the data bit as I and Q channel information, wherein said step of processing information associated with the bit to determine whether to interpret the bit as the first or second binary value includes processing information derived from either the I channel or the Q channel.

16. A method of binary phase shift key demodulation for a signal conveying bits, said method comprising:
   associating an I, Q vector to a reference bit;
   associating an I, Q vector to a subsequent bit;
   interpreting the subsequent bit as a first binary value if the vector associated with the subsequent bit is within a first range of vector angles from the vector associated with the reference bit;
   interpreting the subsequent bit as a second binary value if the vector associated with the subsequent bit is outside of a second range of vector angles from the vector associated with the reference bit; and
   processing information associated with the subsequent bit to determine whether to interpret the subsequent bit as the first or second binary value if the vector associated with the subsequent bit is outside the first range of angles and within the second range of angles from the vector associated with the reference vector, and for accordingly interpreting the bit.

17. A method as set forth in claim 16, wherein said step of interpreting the subsequent bit as a first binary value includes interpreting the subsequent bit as the first binary value if the vector associated with the subsequent bit is within ±60° from the vector associated with the reference bit, said step of interpreting the subsequent bit as a second binary value includes interpreting the subsequent bit as the second binary value if the vector associated with the subsequent bit is outside of ±120 from the vector associated with the reference bit.

18. A method as set forth in claim 16, including updating the vector reference associated with the reference bit.

19. A method as set forth in claim 16, including providing the data bit as I and Q channel information, wherein said step of processing information associated with the subsequent bit to determine whether to interpret the bit as the first or second binary value includes processing information derived from either the I channel or the Q channel.

* * * * *